United States Patent [19]

Patterson

[11] 4,407,305

[45] Oct. 4, 1983

[54] TOBACCO LEAF-STRIPPING MACHINE

[76] Inventor: Calvin D. Patterson, 5201 Bennett La., La Grange, Ky. 40031

[21] Appl. No.: 409,275

[22] Filed: Aug. 18, 1982

[51] Int. Cl.³ .......................................... A01D 45/16
[52] U.S. Cl. ................................. 130/31 R; 56/27.5; 130/30 R
[58] Field of Search ............... 130/31 R, 30 R, 30 G; 56/27.5, 51, 53, 63, DIG. 4; 171/58; 131/327, 290

[56] References Cited

U.S. PATENT DOCUMENTS

| | | | |
|---|---|---|---|
| 958,790 | 5/1910 | Wynberg et al. | 130/31 R |
| 2,723,667 | 11/1955 | Pool | 130/31 R |
| 2,949,118 | 8/1960 | Long | 131/125 |
| 3,855,761 | 12/1974 | Louks et al. | 171/58 |
| 4,160,356 | 7/1979 | Mathews | 56/DIG. 4 |
| 4,292,982 | 10/1981 | Butcher | 130/30 R |

FOREIGN PATENT DOCUMENTS 2021376 12/1979 United Kingdom ............ 130/30 G

*Primary Examiner*—Jay N. Eskovitz
*Attorney, Agent, or Firm*—Richard L. Caslin

[57] ABSTRACT

A machine is shown for use in a tobacco stripping barn for stripping tobacco leaves from the stalk in three separate Grades. The machine has an elevated, elongated workbench or frame with three work stations side-by-side. Each work station comprises a pair of counter-rotating wheels that are adjustably biased into rolling contact with each other, and an adjustable guide member centered at one side of the wheels on which the tobacco stalk is supported as the stalk is passed over the top of the wheels, and the leaves are drawn down into the wheels and thus are pulled from the stalk to fall into a box or bin beneath the workbench. One of the wheels is motor-driven, and the other wheels are arranged in succession and biased as a group into rolling contact with said driven wheel.

14 Claims, 7 Drawing Figures

TOBACCO LEAF-STRIPPING MACHINE

BACKGROUND OF THE INVENTION

1. Field of the Invention

This invention relates to a machine for use in stripping tobacco leaves from the stalk of a plant after the stalk has been severed from the ground and has hung in a tobacco barn for a predetermined length of time to dry out the leaves.

2. Description of the Prior Art

Tobacco stripping is the most time-consuming step in growing and marketing tobacco. Stripping tobacco consists of pulling each leaf from the stalk by hand. The leaves are graded as they are pulled from the stalk. A grade of leaf means the color or texture of the leaf. Generally, the leaves on the bottom one-third of the stalk are one grade, the leaves in the middle one-third are another grade, and the leaves on the top one-third are a third grade; although the portion of the stalk which contains the three grades may vary. With the recent approval of the use of balers for baling tobacco leaves for shipment and final sale, there has been increased activity in the development of a mechanized stripping method for removing the leaves from the stalk. No patents were found which describe such machines, although there is the Long U.S. Pat. No. 2,949,118, which is described as a tobacco stripping and booking machine. This Long machine is apparently for stripping the stem from the tobacco leaf, rather than for stripping the tobacco leaf from the stalk, as is the present invention. The main purpose of this Long machine is for stacking or booking flexible, pliable sheets or strips of tobacco for subsequent use; for example, as cigar wrappers.

Leaf-stripping machines for use with sugar cane stalks are known in this art, but they are not analogous to the present invention because it is the stalk which is of greatest value in the sugar cane business, while the leaves on the sugar cane stalk are generally discarded. The reverse is true in the tobacco business where the tobacco leaf is of greatest value, and the tobacco stalk is discarded.

The Wynberg U.S. Pat. No. 958,790 describes a machine where the sugar cane is fed lengthwise through a pair of rotating brushes so as to remove the natural wax and other impurities from the cane prior to the cane being crushed and submitted to further treatment.

There are three Pool patents—U.S. Pat. No. 2,723,667, U.S. Pat. No. 2,723,668 and U.S. Pat. No. 2,723,669. All three of these patents relate to a combination stalk chopper and leaf stripper for use with sugar cane where the cane is fed between a pair of corrugated feed rolls, and the leaf foilage is removed by a pair of counter-rotating, leaf-stripping rolls, and then the cane stalk is chopped into short lengths by rotating blades.

The Butcher U.S. Pat. No. 4,292,982 describes a leaf-stripping machine for use with tobacco stalks where one motor drives a rotating stalk support tube having an annular knife edge on the front edge thereof. A belt drive from the said tube drives a pair of counter-rotating elongated rollers to form a nip for pulling the leaves from the stalk as the stalk passes horizontally thereover. Any leaves the rollers fail to pull off will be cut off by the annular knife edge as the stalk is pulled through the rotating tube by a pair of motor-driven in-feed rollers at the rear of the machine. This Butcher machine is basically a one grade stripper machine as distinguished from the present invention which separates the leaves into its various grades in a manner similar to the manual stripping of tobacco leaves.

OBJECTS OF THE PRESENT INVENTION

The principal object of the present invention is to provide a tobacco leaf stripping-machine having three closely-spaced work stations for use by one operator who moves between the three stations, or by use of three operators, one at each work station, for separating the leaves into three Grades.

A further object of the present invention is to provide a stripping machine of the class described where each work station comprises a pair of counter-rotating wheels in combination with an adjustable guide member that is centered with respect to each pair of wheels, so that the tobacco leaves will be drawn down into the wheels as the stalk is passed over the guide member.

A further object of the present invention is to provide a stripping machine of the class described with a single drive motor for driving all of the three pairs of counter-rotating wheels with a single motor-driven wheel that serves as a driving wheel, while the other wheels are biased into rotating contact with the adjacent wheel.

A further object of the present invention is to provide a stripping machine of the class described having a workbench that is offset for the work station that handles Grade 3 leaves, which are at the top of the stalk.

A still further object of the present invention is to provide a stripping machine that is compact, with three side-by-side work stations mounted on an elevated workbench or frame with a storage box or bin positioned beneath each work station for catching the leaves as they fall from the wheels in a uniform arrangement in preparation for loading the leaves into a tobacco leaf baler.

SUMMARY OF THE INVENTION

The present invention provides a tobacco leaf-stripping machine having an elevated, elongated workbench, including a series of three work stations. Each work station includes a pair of counter-rotating wheels that are adjustably biased into rolling contact with each other, and a guide member on which a tobacco stalk is supported while the stalk is fed over the top of a pair of wheels, so that the wheels will draw the tobacco leaf down between the wheels and snap the stem of the tobacco leaf from the stalk. A motor drive means is used for turning the wheels.

BRIEF DESCRIPTION OF THE DRAWINGS

The invention will be better understood from the following description taken in conjunction with the accompanying drawings, and its scope will be pointed out in the appended claims.

DESCRIPTION OF THE PREFERRED EMBODIMENTS

Figure 1:
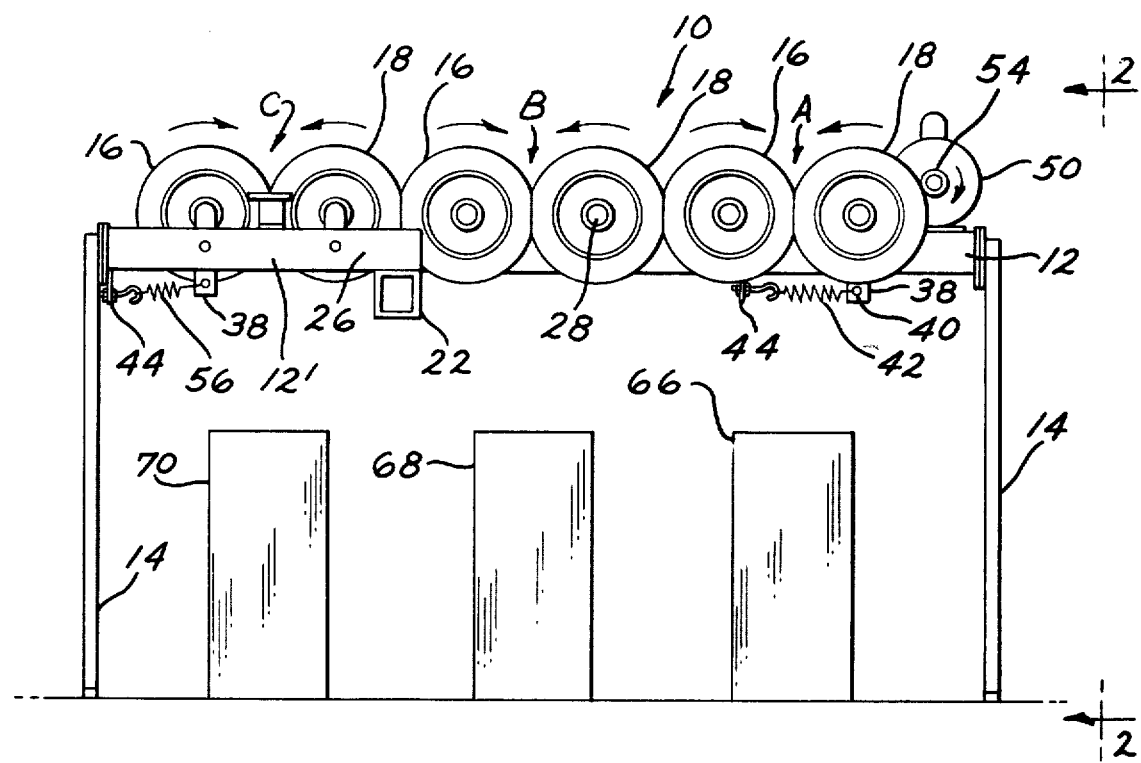
FIG. 1 is a front elevational view of a tobacco leaf-stripping machine embodying the present invention, and showing three side-by-side work stations with a storage box or bin positioned beneath each work station.
Figure 2:
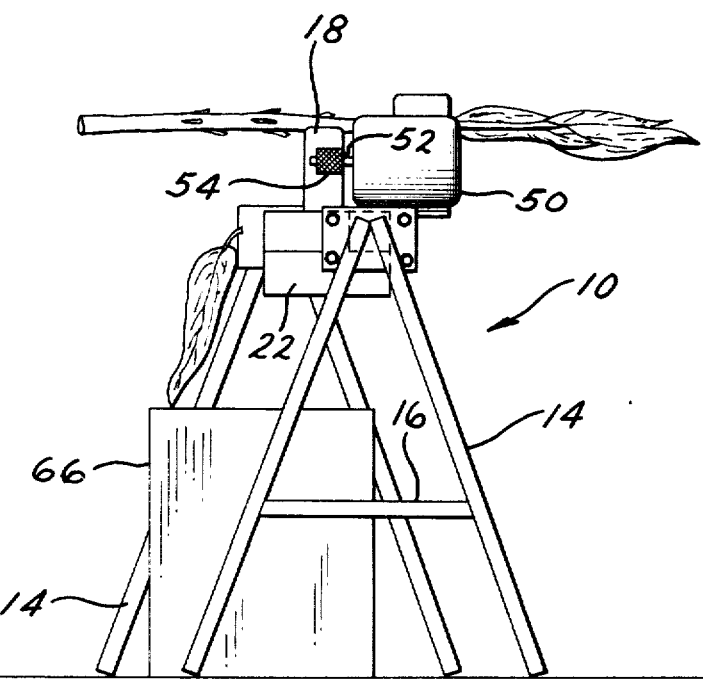
FIG. 2 is a right side elevational view taken on the line 2—2 of FIG. 1, where the operator would stand to the left of the machine of this figure beside the box.

Turning now to a consideration of the drawings, and, in particular, to the front elevational view of FIG. 1, there is shown a tobacco leaf-stripping machine 10 embodying the present invention. This machine 10 has an elevated, elongated workbench or frame 12 that is supported at the opposite ends by pairs of legs 14 in the shape of an A-frame, as is best seen in FIG. 2. A horizontal brace 16 reinforces the legs 14 to create a strong supporting structure. This machine 10 has three work stations which are identified as A, B and C. Work station A is for stripping Grade 1 leaves, which are near the bottom of the stalk. Work station B serves to strip Grade 2 leaves, which are near the center of the stalk, and work station C is used to strip Grade 3 leaves, which are at the top of the stalk. As seen in FIG. 1, each work station includes a pair of counter-rotating wheels 16 and 18 respectively, which turn toward each other at the top of the wheels, as is shown by the directional arrows in FIG. 1.

Figure 3:
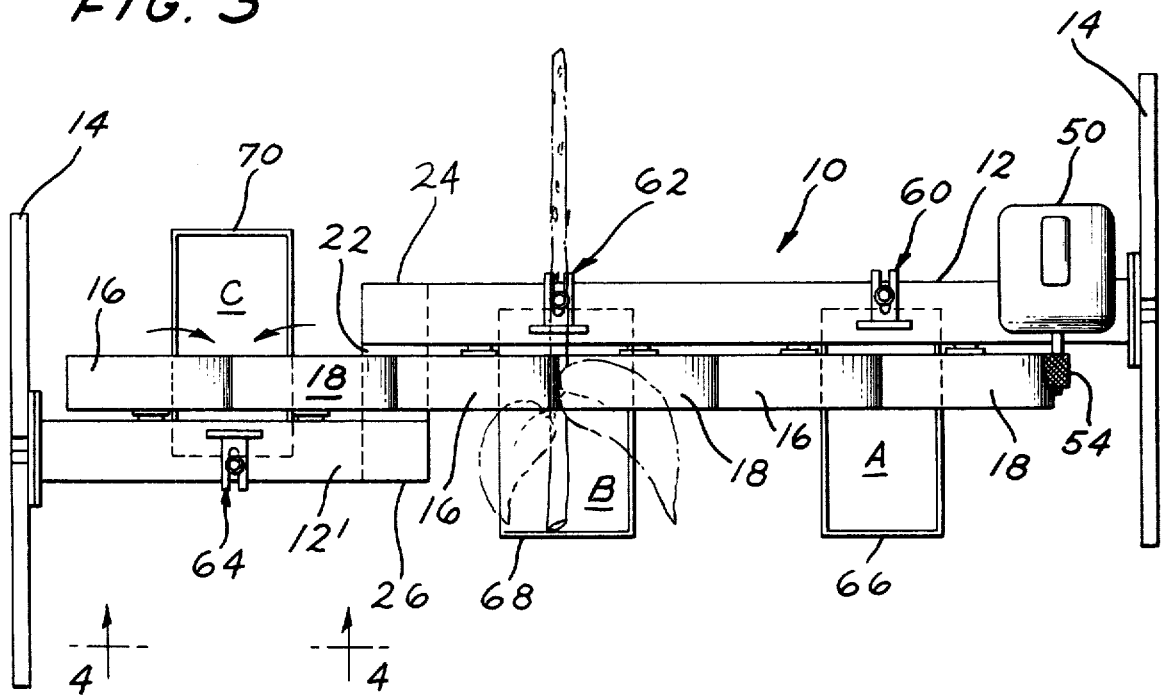
FIG. 3 is a top plan view of the stripping machine of FIG. 1, showing in phantom view a tobacco stalk positioned at the second work station for removing Grade 2 leaves, which are at the center of the stalk. Notice the offset or zig-zag nature of the workbench at the third work station.

The nature of the workbench or frame 12 can best be understood from the top plan view of FIG. 3. This frame is made out of steel box tubing that is 3-inch by 3-inch in transverse cross section. This frame 12 has an offset portion 12' which is positioned in front of the wheels 16 and 18 of the third work station C. The main frame 12 is positioned behind the wheels of the first two work stations A and B, as is clearly seen in FIG. 3. These two frame sections 12 and 12' are joined together by an intermediate section 22 which underlies the innermost end 24 of frame 12 and the innermost end 26 of frame 12'. Of course, these sections 12, 22 and 12' would be joined together by welding or the like to form a unitary workbench or frame. Notice also that the three pairs of wheels 16 and 18 are all arranged in a single, vertical plane, as is clear from FIG. 3, so that they are in rolling contact with adjacent wheels.

Figure 4:
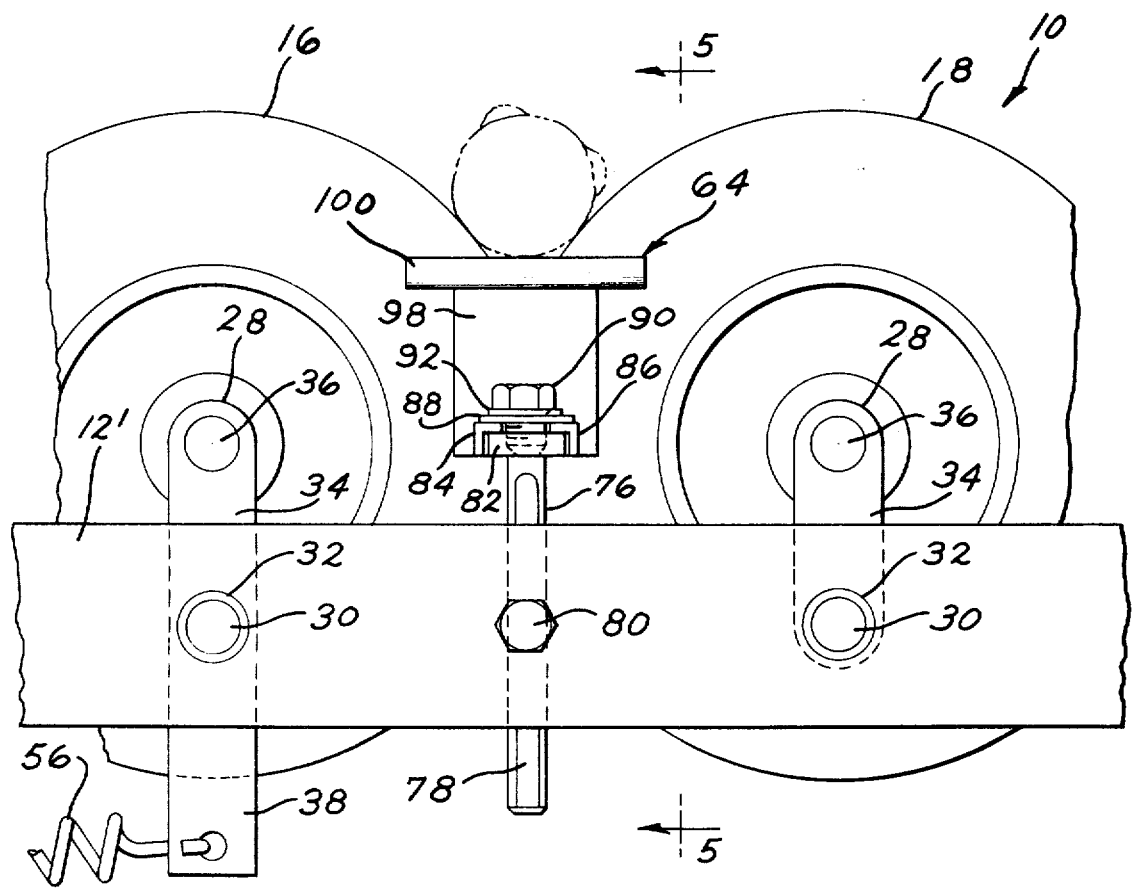
FIG. 4 is a fragmentary, front elevational view, on an enlarged scale, of the third work station, which is at the left side of the machine, taken on the line 4—4 of FIG. 3. Notice the nature of the adjustable guide member on which the tobacco stalk is supported as the stalk is passed over the counter-rotating wheels.
Figure 5:
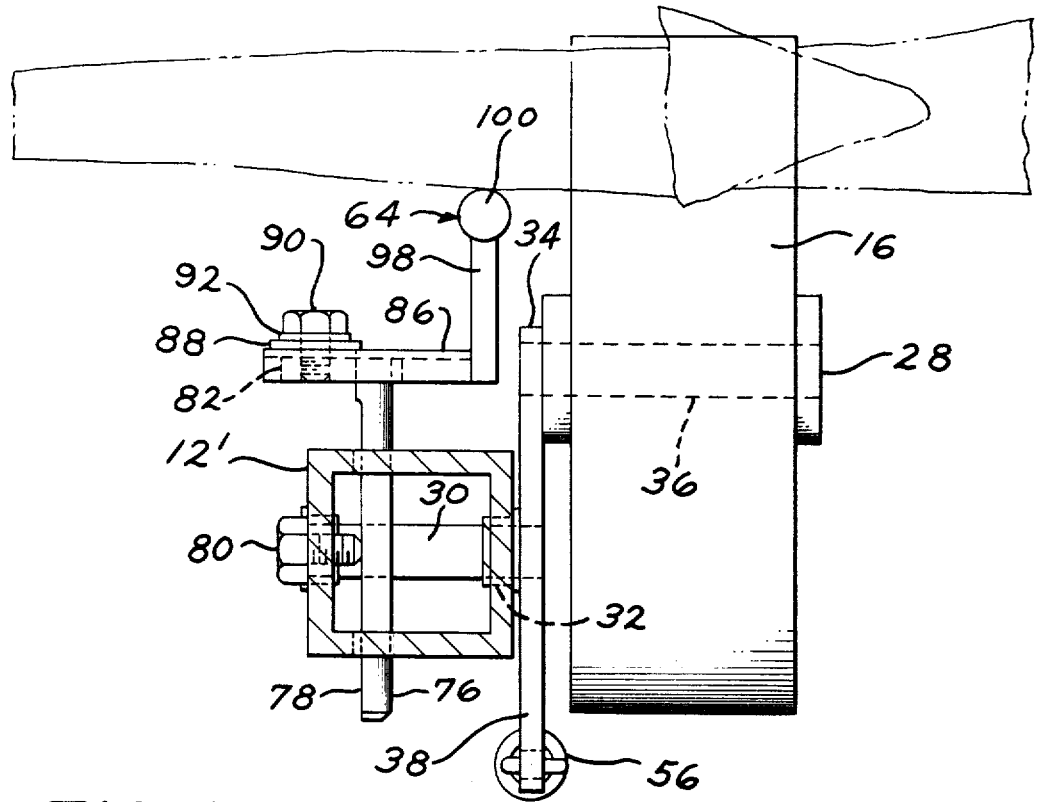
FIG. 5 is a fragmentary, transverse, elevational view of the workbench taken on the line 5—5 of FIG. 4, showing one of the wheels supported on its offset axle from the workbench, as well as showing the adjustable guide member on which the tobacco stalk is supported.
Figure 6:
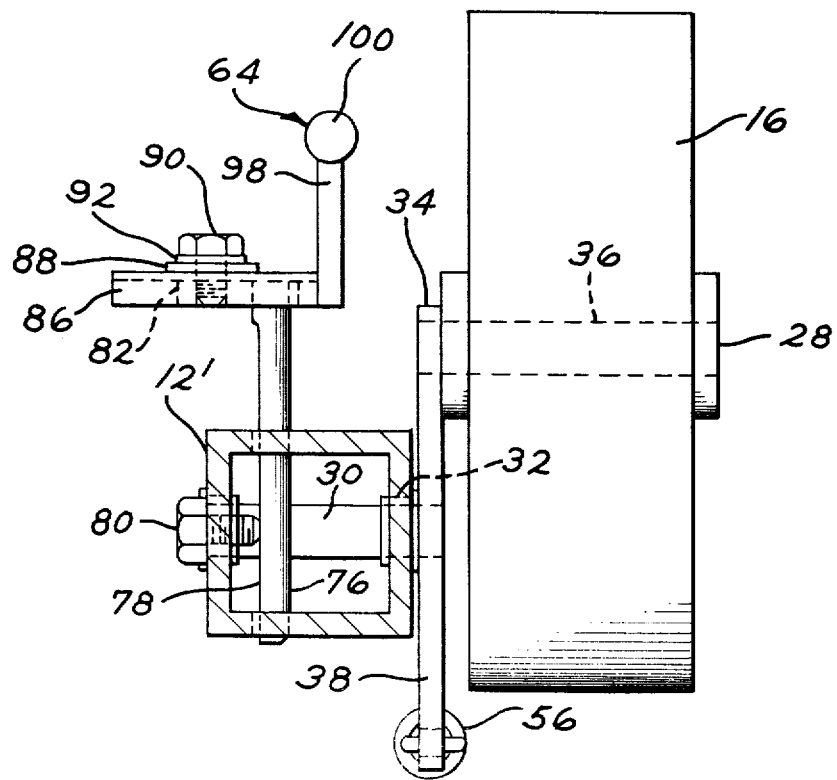
FIG. 6 is a view similar to FIG. 5, showing the guide member adjusted both vertically and horizontally.
Figure 7:
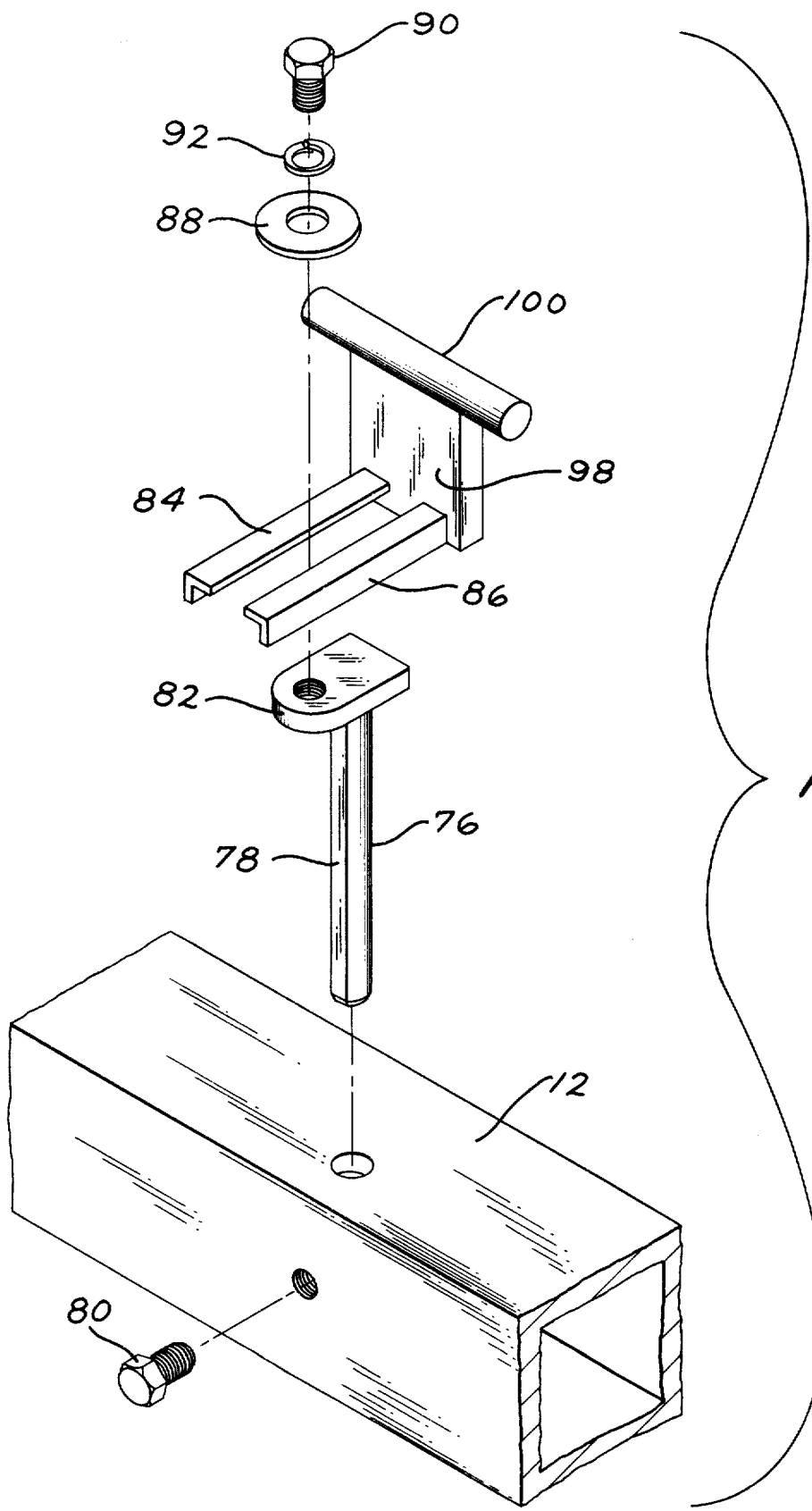
FIG. 7 is an exploded perspective view of one of the adjustable guide members.

Mention will now be made of how each wheel is supported from the frame 12 or 12'. Looking first at FIG. 5, the wheel 16 is shown supported on a Z-shaped axle 28, having a lower end 30 that extends completely through the box beam 12' and is supported in suitable bronze bushings 32. The end of the lower axle section 30 that is nearest the wheel 16 is furnished with a strap or crank arm 34 which extends upwardly to the innermost end of the upper axle section 36 on which the wheel 16 is mounted and held in place. Each wheel 16 or 18 is a rubber-tired wheel of about 8 inches in diameter having ball bearings which are not shown. The first wheel 18, shown at the right side of FIG. 1, and the last wheel 16, shown at the left side, are provided with an axle 28 that has a downward extension 38, as is seen in FIGS. 1, 4 and 5. The lower end of this extension 38 is provided with an opening 40 for receiving one end of a tension spring 42. The other end of this tension spring 42 is supported from an adjustable mounting support 44 that is attached to the frame 12 or 12'. Thus the spring 42 serves as a biasing means to urge the right-hand end wheel 18 to pivot clockwise in FIG. 1 about the lower end 30 of its Z-shaped axle 28.

This leaf-stripping machine 10 is provided with a single electric drive motor 50 that is mounted at the right end of the workbench or frame 12. Looking at the right side or end view of FIG. 2, this motor 50 has a drive shaft 52 supporting a small, knurled wheel or roller 54 against which the first wheel 18 is biased by the spring 42. Thus, when the motor 50 is energized, the first wheel 18 will be driven counterclockwise by the rolling engagement between that wheel 18 and the knurled roller 54. Each of the five remaining wheels are also supported on a Z-shaped axle 28, but only the last wheel 16 is provided with spring-biasing means 56, which is similar to tension spring 42, for urging the last wheel, which is at the left side of FIG. 1, in a pivoted, clockwise direction which serves to urge each wheel in succession against the next wheel so that all of the wheels are in rolling contact with adjacent wheels, and finally with the driven wheel 18 at the right side of FIG. 1. In summary, the right-hand wheel 18 is biased clockwise into rolling contact with the knurled roller 54, while the last wheel 16, at the left end of the machine, is biased clockwise about its Z-shaped axle 28; thereby causing all of the wheels to turn at substantially the same speed, in pairs of counter-rotating groups that are aligned with each work station A, B and C. Thus, the left-hand wheel 16 of FIG. 1 has an axle 28 with a downward extension 38, and an adjustable mounting support 44 similar to the arrangement for the right-hand wheel 18 in FIG. 1. Thus, it will be understood that, while this machine 10 has three work stations A, B and C, it needs only one drive motor 50, and it does not employ a gear drive or a belt drive. There is the added advantage that each pair of counter-rotating wheels 16 and 18 are adjustably biased into rolling contact with each other, such that if an operator's finger or hand were to be drawn between the wheels 16 and 18, no injury would occur since the wheels would merely pivot apart and allow the finger or hand to pass down between the wheels. Or, if a tool were to fall between the wheels, the wheels would not become jammed, but again would merely separate and allow the tool to pass down between the wheels. Thus, there is no safety danger of an accident occurring which might otherwise dictate that suitable guards or housings be built over the wheels in order to prevent personal injury or damage to the operator or to the machine. That is the advantage of having both tension springs 42 and 56 adjustably mounted so that the tension can be calibrated correctly to ensure that the tobacco leaves are pulled by the stem from the stalk rather than the leaf being torn in two, remote from the stem.

Each work station A, B and C is furnished with an adjustable guide member for supporting the stalk as it is fed through the pair of stripping wheels 16 and 18. The operator for each work station will stand in front of the machine. Work Station A as seen in FIG. 3 has an adjustable guide member 60 which is on the back side of the machine and centered on a line that is central of the two wheels 16 and 18. The second work station B has a similar adjustable guide member 62 that is likewise mounted at the rear of the machine and centered between the two stripping wheels 16 and 18. The third work station C has an adjustable guide member 64, but it is different from the other guide members 60 and 62 in that it is mounted at the front of the machine, although centered with respect to the two stripping wheels 16 and 18. First notice the placement of the three leaf storage boxes shown in the top plan view of FIG. 3. Work station A has the cardboard box 66 which is adapted to catch the leaves of Grade 1 after it is stripped from the stalk. Work Station B has leaf storage box 68 and it is generally in the same position as the first box 66. The third work station C has a leaf storage box 70 but it is positioned more toward the rear of the machine because the leaves of Grade 3 fall from the stalk at the rear of the machine while Grades 1 and 2 fall from the stalk at the front of the machine.

Assuming three operators are standing at the front of the machine 10 the unstripped tobacco stalks would be brought to the machine from the right side thereof and the operator at work station A would pick up the stalk and holding it by the bottom end would lay the stalk over the two stripping wheels 16 and 18 and rest the stalk on the adjustable guide member 60 and would proceed to strip the leaves from the lower third of the stalk, it being understood that the operator is pushing the stalk away from him towards the rear of the machine. After the two leaves are removed the first operator will hand the stalk to the second operator at work station B and this operator will proceed to remove the Grade 2 leaves, again pushing the stalk away from him toward the rear of the machine thereby removing the leaves from the center third of the stalk. Then the stalk is handed to the third operator at work station C and the operator will rest the stalk horizontally on the third adjustable guide member 64 and will pull the stalk toward the operator for stripping the leaves at the top of the stalk, which are the Grade 3 leaves. It should be understood that when the leaves fall into the boxes 66 and 68 the stem end of the leaves point toward the rear of the machine, while the leaves that fall into the third box 70 from work station C have the stem end of the leaves facing towards the front end of the machine.

The tobacco leaf-stripping machine 10 of the present invention is particularly useful for use in preparing the leaves for loading into a baling machine. One of the regulations placed on baled tobacco states that the leaves must be placed in the bale with two leaves in tandem with their stem ends facing outwardly so that they may be inspected by potential buyers and auctioneers. In developing this machine it was important that the leaves fall into the boxes in a uniform manner to prevent the need to straighten them by hand before placing the leaves into the baler box, which would be time consuming and added work. One of the secrets found in the use of the present invention was that the speed of the stripping wheels 16 and 18 was found to be critical in placing the leaves straight in the boxes 66, 68 and 70. If the stripping wheels turn too slow, the leaves would fall in a indiscriminate manner. If the stripping wheels turn too fast, the leaves would be blown into the box crooked. A preferred speed of the stripping wheels is in the order of 600 RPMs and this tends to place the leaves straight in the boxes as desired. Thus the leaves can be loaded directly from the boxes into the baler box to save time and labor.

Now turning to a consideration of FIGS. 4–7 of the drawings, it should be understood that the adjustable guide members 60, 62 and 64 are each vertically and horizontally adjustable with respect to the workbench or frame 12 or 12'. Only guide member 64 will be described in detail but it should be understood that the other two are made in a similar manner. Each adjustable guide member has an elongated vertical rod 76 which extends down through the top of the workbench or frame 12 or 12'. This vertical rod has a milled flat side 78 for cooperation with a set screw 80 which fits through a suitable hole in the side of the frame 12' for releasably locking this vertical rod in place. In other words, if the guide member 64 should be raised this set screw would be loosened and the rod 76 would be raised and then the set screws would be tightened. The top end of the rod 76 is furnished with a flattened head 82 which cooperates with a pair of horizontal angle irons 84 and 86 that are arranged in parallel to form a guideway into which the flattened head 82 is positioned. A washer 88 and lock washer 92 sit on top of the angle irons 84 and 86. A set screw 90 fits through the washers and down between the angle irons 84 and 86 and is threaded into the head 82 of the vertical rod, for locking the guideway in place relative to the vertical rod 76. In order to adjust the horizontal position of the guideway, the set screw 90 would be loosened and the guideway would be shifted either toward or away from the stripping wheels 16 and 18. The two angle irons 84 and 86 are spaced apart by a vertical plate 98 that is positioned adjacent the stripping wheels 16 and 18. This vertical plate is welded or otherwise attached to the ends of the two angle irons 84 and 86. The top edge of the vertical plate is provided with a horizontal rod 100 which serves as the supporting rest for the stalk as the stalk is being fed horizontally over the top of the two stripping wheels 16 and 18.

The adjustability of each one of these guide members 60, 62 and 64 is one of the most important aspects of this tobacco leaf-stripping machine 10. Tobacco, like most crops, when marketed has to be cleaned and free of foreign matter. Tobacco is marketed by weight and adding weight with foreign matter is called "nesting". The penalty for nesting the tobacco is a fine and it may include imprisonment. The tobacco stalk may include "suckers" or shoots that grow out from where the leaf stem attaches to the stalk. There are chemicals that are sprayed on the tobacco at cutting time to stop or retard the growth of suckers. Frequently the tobacco stalks will have small suckers on them that the chemicals did not reach.

If the tobacco stalk is free of suckers, the adjustable guide member may be positioned so that the stalk lies horizontally just touching the stripping wheels 16 and 18. If the tobacco stalks have suckers the guide member such as 60 is raised so that the stalk will be held high enough above the stripper wheels 16 and 18 so that the suckers will not touch the stripper wheels, hence the wheels will not pull the suckers from the stalk. This explains the need for the vertical adjustability of the guide members 60, 62 and 64.

Now for an understanding of the horizontal adjustability of these guide members. When the tobacco is relatively dry, the leaves tend to be stiffer and the stem is brittle. The stiffer leaves tend to hold up from the stripper wheels and they are not caught as quickly by the wheels as the stalk is passed over the top of the wheels. When the guide member is set too close to the wheels, part of the tobacco stem that is attached to the stalk will pass over the guide before the leaf is removed by the wheels. Then when the wheels remove the leaf, the stem will break at the point at which it rests on the guide member, thus leaving part of the leaf attached to the stalk. By adjusting the guide members away from the stripping wheels this problem is solved and the leaf is removed clean at the stem. This feature of horizontal adjustability of the guide member also solves the problem of the leaves being wrapped to the stalk.

When wet tobacco is being processed through this machine 10, the guide member is set close to the stripper wheels 16 and 18 for better control of the stalk. Usually with this type of tobacco the leaves will hang down and away from the stalk and will be snapped from the stalk instantly once engaged by the wheels. If the tobacco is piled when it is damp, the leaves will tend to wrap or stick to the stalk. When this happens the guide should be moved back away from the wheels.

An important advantage of using the adjustable guide members is that the operator does not have to turn the stalk as he feeds the stalk across the top of the stripper wheels. Also the leaves are removed clean from the stalk and the operator does not have to move the stalk back and forth across the stripper wheels to clean the stalk. One single pass of the stalk is all that is needed.

Having described above my invention of a tobacco leaf-stripping machine, it will readily be apparent to those skilled in this art that this machine was designed so that the three operators will stand in the same order as if they were stripping the tobacco by hand, only this machine takes about one-third the space as is used when done manually. When this machine is fully operating, there would be three operators as well as a fourth person for material handling of the unstripped tobacco as well as removing the stripped leaves from the storage boxes and placing them in the tobacco baler, as well as removing the stripped stalks. Some farmers are stripping their tobacco in 3 Grades, some in 2 and some in 1 Grade. This machine will strip 1, 2 or 3 Grades and with one, two or three operators. This machine was built to fit into any tobacco stripping operation. Tobacco stripping is the most time consuming step in growing and marketing tobacco. If the workbench or frame 12 were of a straight line construction with all three of the adjustable guide members on the rear side of the machine, it would be necessary for the second operator of work station B to throw the stalks on the rear side of the machine. The third operator would have to stand on the rear side and feed the stalks from the rear side towards the front of the machine in order to strip the leaves. This requires a double handling of the stalks and it also takes up more floor space for operation of the machine. This third operator would have to turn the stalk end to end by 180 degrees and then pass the stalk across the stripping wheels from the rear side to the front side. It may not seem too difficult to do this operation but it should be remembered that there are about 9000 tobacco stalks to the acre of tobacco, and the extra movement that would be involved with a straight frame would cause a great deal more labor and extra time for completing the stripping operation. It should be understood by those skilled in the art that depending on whether the operators are left handed or right handed, the work stations A, B and C may be reversed if desirable. In other words, the drive motor 50 could be mounted on the left side of the machine and the first work station A would be at the left and the third work station C would be at the right of the machine.

Modifications of this invention will occur to those skilled in this art. Therefore, it is to be understood that this invention is not limited to the particular embodiments disclosed, but that it is intended to cover all modifications which are within the true spirit and scope of this ivention as claimed.

What is claimed is:

1. A tobacco leaf-stripping machine comprising:
   a. an elevated, elongated workbench including an integrated series of adjacent work stations;
   b. each work station including a vertically adjustable guide member on which a tobacco stalk is to be rested in a generally horizontal position, as well as a pair of counter-rotating wheels arranged in a vertical plane on moving centers, said wheels being resiliently biased into rolling frictional contact with each other and centered with respect to the guide member, at least one wheel of each work station being in frictional contact with a complementary wheel of an adjacent work station; and
   c. a single motor drive means for turning one of the wheels thereby causing all of the wheels in succession to turn, whereby the tobacco leaves are adapted to become pinched between the wheels of a particular work station and thereby caused to be pulled from the stalk and fall into a receptacle located beneath that particular work station.

2. The tobacco leaf-stripping machine, as is recited in claim 1, wherein there are at least three side-by-side work stations having six stripper wheels each arranged in a series-rolling frictional relationship with an adjacent wheel within a common vertical plane, each wheel being supported at its center upon an offset axle that is pivoted from the workbench and allows each wheel to swing about a short arc, and spring means acting on certain of said wheels so that they are resiliently biased into rolling frictional contact with the adjacent wheel.

3. The tobacco leaf-stripping machine, as is recited in claim 2, wherein the said single motor drive means has a drive roller in rolling contact with one end wheel of the series, and the other five wheels in the connected series of wheels are driven by being in rolling frictional contact with the adjacent wheel in the series.

4. The tobacco leaf-stripping machine, as is recited in claim 3, wherein the third endmost work station has the said adjustable guide member positioned on the front side of the two stripper wheels on that third work station for use in stripping the leaves at the top of the stalk, while the other two work stations have each of said adjustable guide members positioned on the back side of the pair of stripper wheels of each said work station.

5. The tobacco leaf-stripping machine, as is recited in claim 4, wherein the said elevated workbench is of beam-like design that is positioned behind the first two adjacent work stations, while the workbench is positioned in front of the third work station to give the workbench an offset or zig-zag configuration in top plan view.

6. The tobacco leaf stripping machine, as is recited in claim 5, wherein the said workbench of beam-like design is formed of generally three frame sections having a front frame section in front of the third work station, a rear frame section behind both the first and second work stations, and a cross brace joining the innermost ends of the said front and rear frame sections on the underside thereof so as not to interfere with the freedom of movement of the rotating wheels.

7. The tobacco leaf-stripping machine, as is recited in claim 1, wherein the said adjustable guide member at each work station is both vertically and horizontally adjustable from the said workbench each of said guide members serving as a horizontal rest for a tobacco stalk being stripped so that the rotating wheels cannot pull the stalk into the wheels as well as to prevent the wheels from reaching the suckers on the tobacco stalk.

8. A tobacco leaf-stripping machine comprising:
   a. an elevated, elongated workbench including an integrated series of at least two adjacent work stations;
   b. each work station having a pair of counter-rotating wheels that are arranged in a common vertical plane on moving centers to be in rolling frictional contact with each other;
   c. and motor drive means mounted on the workbench and driving one of the said wheels of one work station;
   d. all of the said rotating wheels of the machine being arranged in series in a common vertical plane to be in rolling contact with an adjacent wheel;
   e. each wheel being mounted upon a swinging axle that is pivotally mounted from the workbench so each wheel is capable of swinging about an arc;
   f. and spring-biasing means for urging the pivoted wheels into series rolling frictional contact with an adjacent wheel.

9. The tobacco leaf-stripping machine, as is recited in claim 8, wherein the said motor drive means has a shaft supporting a drive roller, and the said spring-biasing means acts to urge the nearest end wheel into rolling contact with the said drive roller, said spring-biasing means also acting upon the wheel at the opposite end of the series of wheels to urge it into rolling contact with the adjacent wheel, and urge each wheel in turn into rolling contact with the next adjacent wheel.

10. The tobacco leaf-stripping machine, as is recited in claim 9, wherein there are at least three work stations, the said workbench being formed generally of three beam-like frame sections, a first frame section positioned behind two of the adjacent work stations, a second frame section positioned in front of the third work station, and a cross brace positioned beneath the two frame sections and joined to the innermost ends thereof, each work station including a vertically-adjustable guide member that is supported from the workbench to be centered between the nearest pair of rotating stripper wheels, said adjustable guide member serving as a rest for a horizontal tobacco stalk to prevent the stalk from being pulled down into the rotating wheels, said guide members being located on the said first frame section to the rear of the first and second work stations and on the said section frame section to the front of the third work station.

11. A tobacco leaf-stripping machine, as recited in any of claims 1, 4 or 10 wherein each of the said adjustable guide members are both vertically and horizontally adjustable with respect to the related pair of rotating stripper wheels.

12. A tobacco leaf-stripping machine, as recited in any of claims 4, 5, 6, or 10, wherein the said first two work stations are for stripping Grades 1 and 2 tobacco leaves that are located near the bottom and center respectively of the stalk, while the third work station is for stripping Grade 3 leaves that are located near the top of the stalk, and the operator for each work station is adapted to stand at the front of the machine, and the tobacco stalk would be held horizontally over the top of each pair of counter-rotating stripper wheels and fed in a direction toward the related adjustable guide member.

13. A tobacco leaf-stripping machine, as recited in either claims 4, 5, 6, or 10, wherein the operator for each work station would stand at the front of the machine, and the tobacco stalk would be fed horizontally over the top of the counter-rotating stripper wheels in a direction toward the adjustable guide member.

14. A tobacco leaf-stripping machine, as recited in either claims 1, 2, 5, 10 or 11, wherein each work station is furnished with a leaf storage receptacle positioned beneath the machine for catching the leaves naturally in a uniform formation and Grades, and the speed of the said stripper wheels is in the range of about 600 r.p.m's, plus or minus 50 revolutions.

* * * * *